(12) United States Patent
Azuma (10) Patent No.: US 6,938,158 B2
(45) Date of Patent: Aug. 30, 2005

(54) SINGLE SIGN-ON SYSTEM AND SINGLE SIGN-ON METHOD FOR A WEB SITE AND RECORDING MEDIUM

(75) Inventor: Tomihiko Azuma, Tokyo (JP)

(73) Assignee: NEC Corporation, Tokyo (JP)

( * ) Notice: Subject to any disclaimer, the term of this patent is extended or adjusted under 35 U.S.C. 154(b) by 849 days.

(21) Appl. No.: 09/891,992

(22) Filed: Jun. 26, 2001

(65) Prior Publication Data

US 2002/0007460 A1 Jan. 17, 2002

(30) Foreign Application Priority Data

Jul. 14, 2000 (JP) ........................................ 2000-214625

(51) Int. Cl.⁷ ................................................ G06F 1/24
(52) U.S. Cl. ..................... 713/182; 713/168; 713/193; 713/200; 713/201
(58) Field of Search ............................... 713/182, 168, 713/161, 193, 200, 201

(56) References Cited

U.S. PATENT DOCUMENTS 5,974,572 A 10/1999 Weinberg et al.
6,198,824 B1 * 3/2001 Shambroom ................ 380/279
6,230,205 B1 * 5/2001 Garrity et al. .............. 709/231
6,256,739 B1 * 7/2001 Skopp et al. ............... 713/201

FOREIGN PATENT DOCUMENTS

JP 10-177552 6/1998
JP 2000-3334 1/2000

\* cited by examiner

Primary Examiner—Thomas R. Peeso
(74) Attorney, Agent, or Firm—Scully Scott Murphy & Presser (57) ABSTRACT

A user authentication proxy 2 provided between a user terminal 1 and a web server 4 saves therein information associated with a sequence of user authentication processes between the user terminal and a web server performed by a user. This information includes a web site URL, data received by the user terminal from the web server for user authentication, and data sent by the user terminal to the web server for user authentication. When the user specifies the URL of a web site from any user terminal, the proxy compares data on the URL received from the web server specified by the URL with received data saved in the proxy. If they match, the proxy does not send the data from the web server to the user terminal but sends user authentication operation sending data to the web server on behalf of the user terminal.

10 Claims, 6 Drawing Sheets

| USER ID | PASSWORD |
|---------|----------|
| 00001 | pKi#1_*) |
| 00002 | sE=C$(&1 |
| ....... | ........ |

FIG.6

| USER ID | URL | RECEIVED DATA | SENDING DATA |
|---------|-----|---------------|--------------|
| 00001 | http://www.nec.co.jp/customer.html | RECEIVED DATA 1 | SENDING DATA 1 |
| 00001 | http://www.shop1.co.jp/buyer.html | RECEIVED DATA 2 | SENDING DATA 2 |
| 00002 | http://www.nec.co.jp/customer.html | RECEIVED DATA 3 | SENDING DATA 3 |
| 00002 | http://www.books.co.jp/buyer.html | RECEIVED DATA 4 | SENDING DATA 4 |
| .... | ........ | .... | .... |

FIG. 7

RECEIVED DATA 1

```
<HTML>
<BODY>
<FORM ACTION="/cgi-bin/mem_chk" METHOD="POST">
<table>
<tr><tb>User ID</td><td><input type="text" name=uid></td></tr>
<tr><tb>Password</td><td><input type="password" name=pwd></td></tr>
<tr><tb><input type="submit" value="Submit"></td></tr>
</table>
</FORM>
</BODY>
</HTML>
```

SENDING DATA 1

```
uid=00001&pwd=n#ilce_9
```

FIG. 8

RECEIVED DATA 2

```
<?xml version="1.0"?>
<?xml-stylesheet type="text/xsl" href="member.xsl"?>
<member>
        <user_id></user_id>
        <password></password>
</member>
```

SENDING DATA 2

```
<?xml version="1.0"?>
<?xml-stylesheet type="text/xsl" href="member.xsl"?>
<member>
        <user_id>00001</user_id>
        <password>n#ilce</password>
</member>
```

SINGLE SIGN-ON SYSTEM AND SINGLE SIGN-ON METHOD FOR A WEB SITE AND RECORDING MEDIUM

BACKGROUND OF THE INVENTION

1. Field of the Invention

The present invention relates to a surrogate system that performs authentication operations required by a WWW (World Wide Web) server, and more particularly to a single sign-on system for web sites.

2. Description of the Related Art

As more and more web sites require user authentication, the user must do more user authentication operations. These operations impose a heavier burden on the user.

In addition, there is a need for a single sign-on system because it is cumbersome and difficult for the user to remember a plurality of user IDs and passwords.

To satisfy this need, a single sign-on system intended for a particular web site and a PKI (Public Key Infrastructure) based standard method have lately been put to practical use.

For example, Japanese Patent Laid-Open Publication No.2000-3334 has proposed a gateway system. This gateway system receives a user's request via a gateway, converts a user ID and a password, and sends them to the corresponding information providing server or to some other gateway. Upon receiving a response, the gateway system converts back the user ID and the password and returns them to the requesting user. In this way, this system provides users with desired information services, one user ID and one password for each user.

However, the conventional system described above has the following problems.

In a system intended for particular web sites, a web site cannot be added directly to a single sign-on system.

In many cases, the user authentication method at a web site must be changed or a web site must be placed at a particular address.

On the other hand, the PKI based user authentication method requires a user terminal to have the security function installed.

Conventionally, personal computers (PC) have been used for user terminals that access web sites. Recently, more and more terminals with no security function, such as cellular phones, personal digital assistants, and facsimiles (FAX), are used as terminals that access web sites. Therefore, it is virtually impossible for all terminals to be compatible with the PKI.

SUMMARY OF THE INVENTION

The present invention seeks to solve the problems associated with the prior art described above. It is an object of the present invention to provide a system, a method, and a recording medium that perform user authentication operations for a web site requiring user authentication on behalf of the user to reduce the user s burden.

To achieve the above object, the system according to the present invention has a user authentication proxy, which performs user authentication operations for a web site on behalf of the user, between a user terminal connected to a web server over the Internet and the web server. This configuration allows the user authentication proxy to perform user authentication operations for a web site, indicated by a user-specified URL, regardless of the type of a user terminal.

The system according to the present invention comprises a user authentication proxy unit provided between a user terminal and a web server, the user terminal accessing the web server over the Internet, wherein the user authentication proxy unit comprises means for saving information in storage means for use as information associated with a sequence of user authentication processes executed by a user between the user terminal and the web server over the Internet, the information being a combination of three data pieces, that is, a URL (Uniform Resource Locator) of a web site, data received by the user terminal from the web server for user authentication, and data sent by the user terminal to the web server for user authentication; and means for sending a connection request to the web server specified by the URL when the user uses any user terminal to specify the URL of the web site, for comparing, when data on the URL is received from the web server, the received data with data saved in advance in the storage means, and, if a match is found, for sending user authentication sending data saved in advance in the storage means to the web server on behalf of the user terminal instead of transferring to the user terminal the data received from the web server.

DESCRIPTION OF THE PREFERRED EMBODIMENTS

In a system where the user uses, via a user terminal, a plurality of web sites each requiring user authentication, a proxy that performs user authentication operations for the web sites on behalf of the user is provided between the user terminal and a web server. When the user accesses a web site, this system significantly reduces the number of user authentication operations that must be executed by the user on the user terminal.

Figure 1:
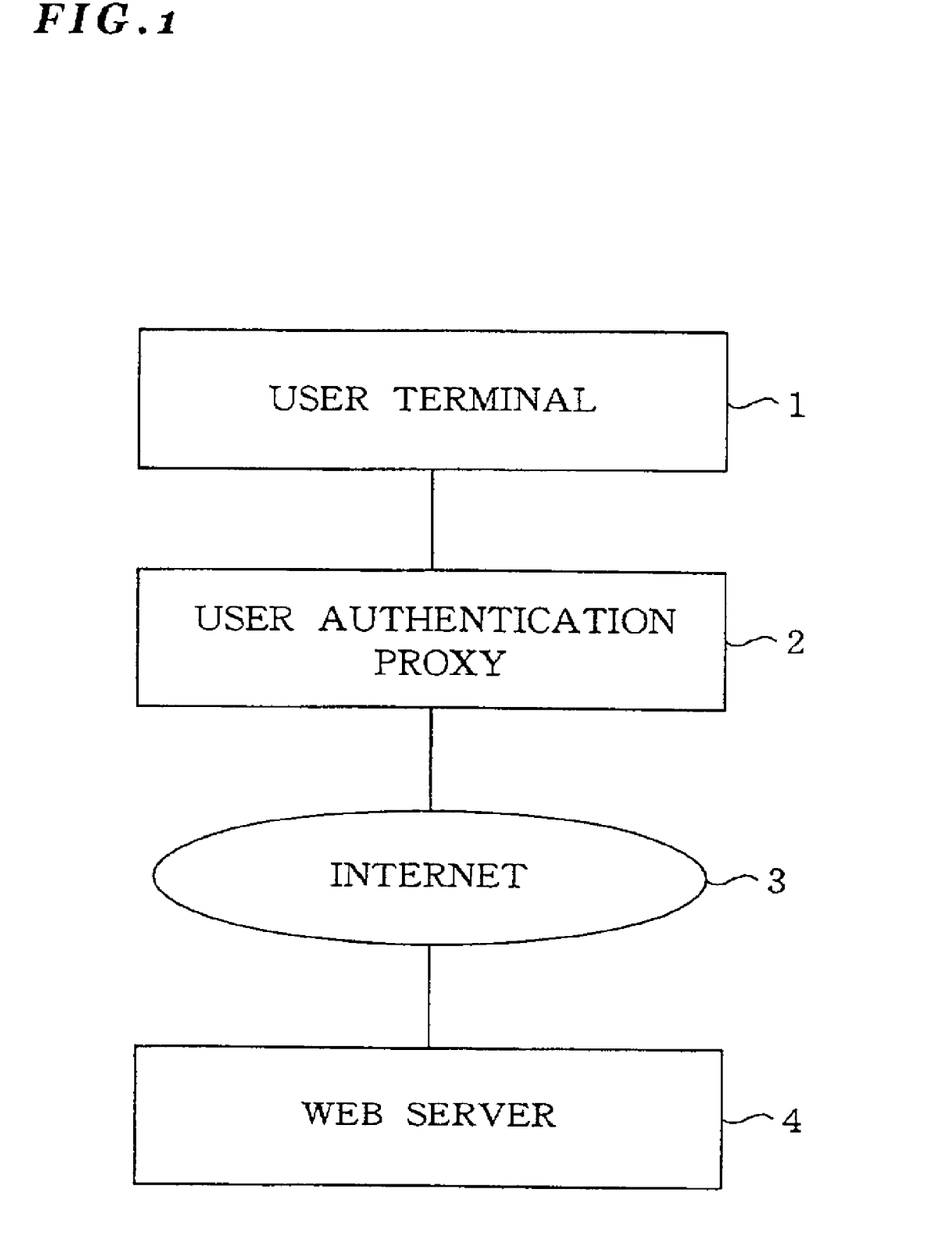
FIG. 1 is a block diagram showing the configuration of an embodiment of the present invention.

Referring to FIG. 1, a user authentication proxy (2) in a preferred embodiment of the present invention records data required for performing user authentication operations.

The user authentication proxy (2) saves information associated with a sequence of user authentication processes executed by the user between a user terminal (1) and a web server (4) over the Internet (3).

Preferably, data that is saved includes:

URL (Uniform Resource Locator) of a web site

Data received by the user terminal (1) from the web server (4) for user authentication, and Data sent by the user terminal (1) to the web server (4) for user authentication Saving a combination of these three data pieces allows the user authentication proxy (2) to perform user authentication operations required for a web site indicated by the user-specified URL regardless of the type of the user terminal (1).

When the user specifies the URL of a web site from any user terminal (1), the user authentication proxy (2) sends a connection request to the web server (4) specified by the URL and receives data on the URL from the web server (4). The user authentication proxy (2) compares the received data with data saved therein beforehand. If they match, the user authentication proxy (2) does not transfer the data, which has been received from the web server (4), to the user terminal (1) but returns user authentication sending data, saved beforehand for use in user authentication, to the web server (4) on behalf of the user.

In a preferred embodiment of the present invention, a program running on a data processing unit (computer) on a user authentication proxy unit provided between a user terminal and a web server, the user terminal accessing the web server over the Internet, causes the computer to (a) save information in storage means for use as information associated with a sequence of user authentication processes executed by a user between the user terminal and the web server over the Internet, the information being a combination of three data pieces, that is, a URL (Uniform Resource Locator) of a web site, data received by the user terminal from the web server for user authentication, and data sent by the user terminal to the web server for user authentication; and (b) send a connection request to the web server specified by the URL when the user uses any user terminal to specify the URL of the web site, compare, when data on the URL is received from the web server, the received data with data saved in advance in the storage means, and, if a match is found, send user authentication sending data saved in advance in the storage means to the web server on behalf of the user terminal instead of transferring to the user terminal the data received from the web server.

The user authentication proxy may be implemented by reading the program from a recording medium (magnetic disk, magnetic tape, optical disc, or semiconductor memory, and so on), on which the program is recorded, into the data processing unit for execution.

Figure 2:
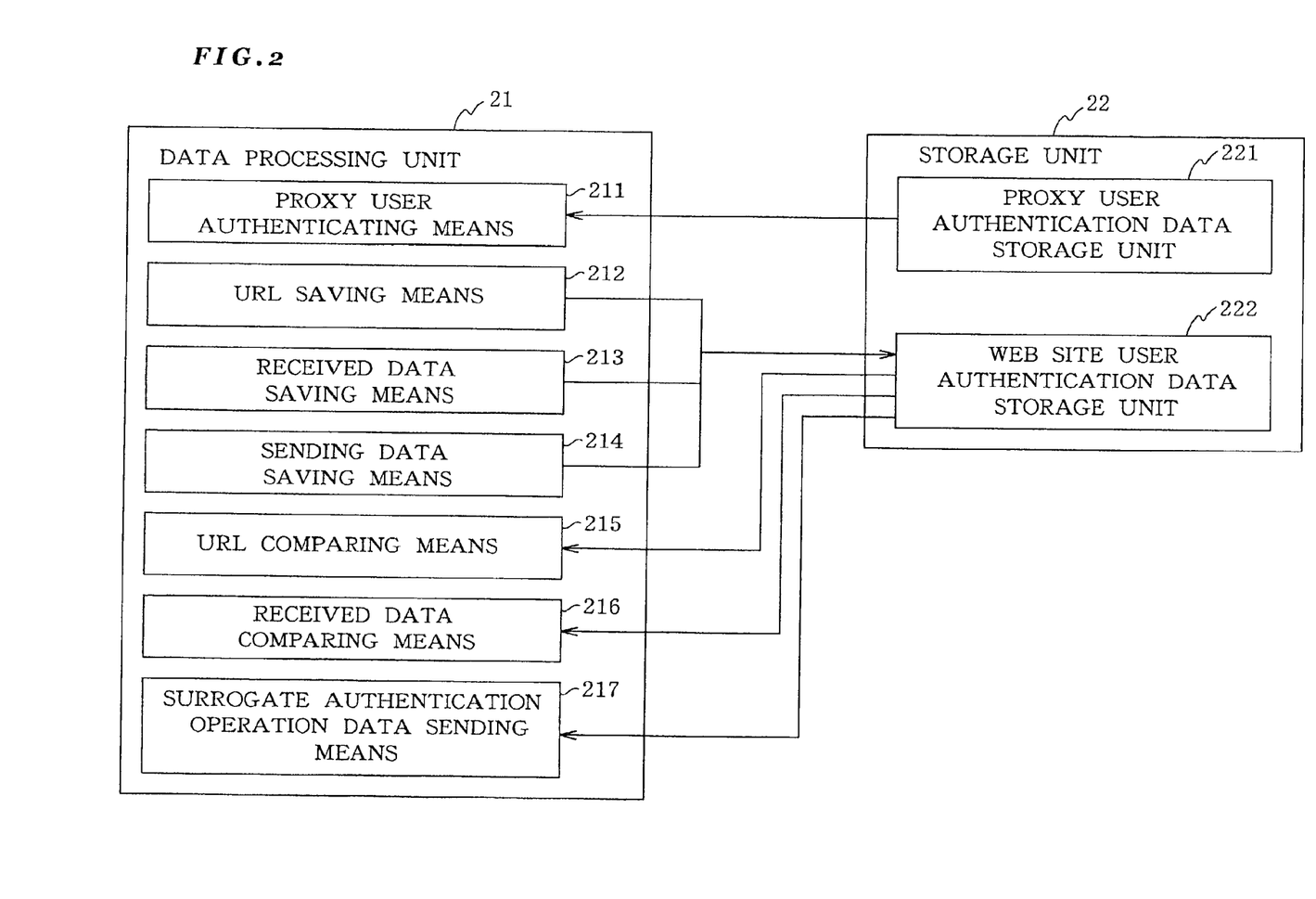
FIG. 2 is a diagram showing the configuration of a user authentication proxy in the embodiment of the present invention.

More specifically, in a preferred embodiment of the present invention, a user authentication proxy unit provided between a user terminal and a web server, the user terminal accessing the web server over the Internet, comprises a storage unit (22) which comprises a proxy user authentication data storage unit (221) that stores therein a user identifier uniquely identifying a user and a password, the user identifier and the password being required for confirming that the user using the user authentication proxy unit is an authorized user; and a web site user authentication data storage unit (222) that stores therein combinations of data, each of the combinations being composed of a user identifier uniquely identifying a user, a URL of a web site, data received by the user terminal from the web server for user authentication, and data sent by the user terminal to the web server for user authentication, proxy user authenticating means (211) for authenticating, using data saved in the proxy user authentication data storage unit (221), whether the user is an authorized user of the user authentication proxy unit; URL saving means (212) for saving a combination of the URL of the web site and the user identifier in the web site user authentication data storage unit, the web site being a web site for which a user has asked the user authentication proxy unit to perform user authentication operations, the user identifier uniquely identifying the user; received data saving means (213) for saving the data, received by the user terminal from the web server for user authentication, into the web site user authentication data storage unit; sending data saving means (214) for saving the data, sent by the user terminal to the web server for user authentication, into the web site user authentication data storage unit (222); URL comparing means (215) for comparing a URL specified by the user on the user terminal with the URL saved in the web site user authentication data storage unit (222) to determine if the URL specified by the user is the one for which the proxy user authentication unit is to perform user authentication operations; received data comparing means (216) for comparing data received from the web server to which a connection is made using the URL specified by the user with the received data saved in the web site user authentication data storage unit; and surrogate authentication operation data sending means (217) which, if the web site user authentication data storage unit stores therein a matching combination of the user identifier, URL, and received data from the web server, judges that user authentication operations may be performed on behalf of the user terminal, obtains corresponding sending data required for performing user authentication operations from the web site user authentication data storage unit, and sends the obtained data to the web server. The processing and functions of the user authentication proxy unit described above are implemented by a program running on the data processing unit (computer) of the user authentication proxy. The user authentication proxy unit may be implemented by reading the program from a recording medium (magnetic disk, magnetic tape, optical disc, or semiconductor memory, and so on), on which the program is recorded, into the data processing unit.

The embodiment of the present invention described above will be described more in detail with reference to the attached drawings. FIG. 1 is a diagram showing the system configuration of one embodiment according to the present invention.

Referring to FIG. 1, the embodiment of the present invention comprises a user terminal 1 such as a personal computer, a cellular phone, a personal digital assistant, or a FAX that is in wired or wireless connection to the Internet 3, a web server 4 that is a data processing unit providing web sites requiring user authentication on the Internet 3, and a user authentication proxy 2 that is a data processing unit acting as a go-between between the user terminal 1 and the Internet 3.

FIG. 2 is a diagram showing an example of the configuration of the user authentication proxy 2 used in the embodiment of the present invention. Referring to FIG. 2, the user authentication proxy 2 comprises a program-controlled data processing unit 21 and a storage unit 22 in which information is stored.

The storage unit 22 comprises a proxy user authentication data storage unit 221 and a web site user authentication data storage unit 222.

The proxy user authentication data storage unit 221 contains information necessary to confirm that the user of the user authentication proxy 2 is an authorized user.

Before asking the user authentication proxy 2 to perform user authentication operations on behalf of the user, the user must prove to the user authentication proxy 2 that the user is an authorized user.

The web site user authentication data storage unit 222 contains combinations, each composed of an identifier uniquely identifying the user, a web site URL, data received by the user terminal 1 from the web server 4 for user authentication, and data sent from the user terminal 1 to the web server 4 for user authentication.

The data processing unit 21 comprises proxy user authenticating means 211, URL saving means 212, received data saving means 213, sending data saving means 214, URL comparing means 215, received data comparing means 216, and surrogate authentication operation data sending means 217.

The proxy user authenticating means 211 uses data saved in the proxy user authentication data storage unit 221 to authenticate the user if the user is an authorized user of the user authentication proxy 2.

The URL saving means 212 saves the URL of a web site, for which the user has asked the user authentication proxy 2 to perform user authentication operations on behalf of the user, into the web site user authentication data storage unit 222. When saved, this URL is combined with the identifier uniquely identifying the user.

The received data saving means 213 saves data, which is received from the web server 4 for user authentication, into the web site user authentication data storage unit 222.

The sending data saving means 214 saves data, which is sent from the user terminal 1 to the web server 4 for user authentication, into the web site user authentication data storage unit 222.

The URL comparing means 215 compares a URL specified by the user on the user terminal 1 with a URL saved in the web site user authentication data storage unit 222 to check to see if the specified URL is the URL of a web site for which user authentication operations are to be performed by the user authentication proxy 2 on behalf of the user.

The received data comparing means 216 compares data received from the web server 4, to which a connection is made using the user-specified URL, with received data saved in advance in the web site user authentication data storage unit 222.

The surrogate authentication operation data sending means 217 obtains data to be sent for performing user authentication operations from the web site user authentication data storage unit 222 and sends the obtained data to the web server 4.

The processing and functions of the proxy user authenticating means 211 and the surrogate authentication operation data sending means 217 are implemented by the programs running on the data processing unit 21.

The operation of the embodiment according to the present invention will be described with reference to FIGS. 1–8.

Figure 3:
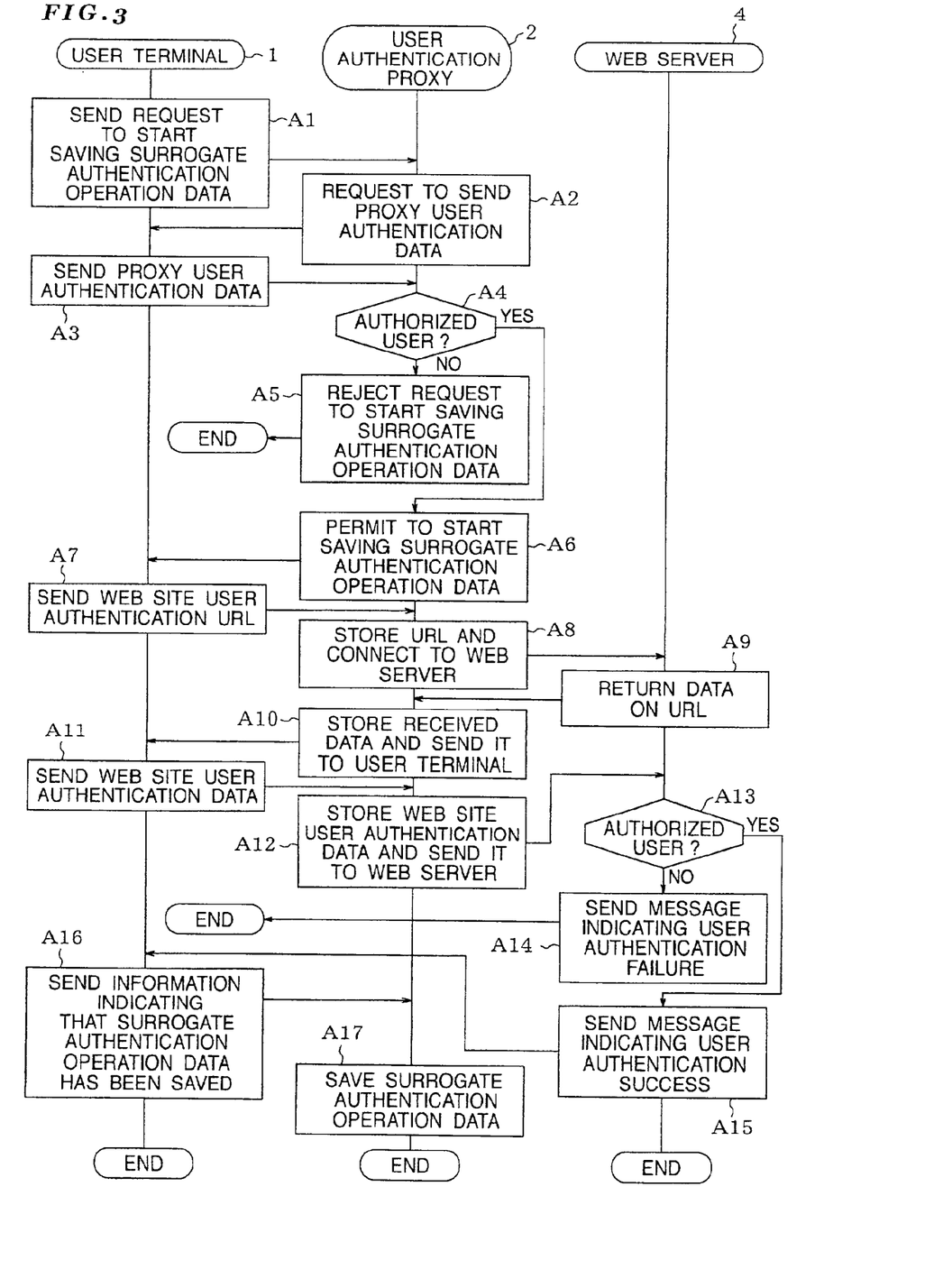
FIG. 3 is a flowchart showing the operation of the embodiment of the present invention.

First, with reference to the flowchart in FIG. 3, the following describes in detail how the user saves data to be used in asking the user authentication proxy 2 to perform user authentication operations on behalf of the user.

The user sends a request from the user terminal 1 to the user authentication proxy 2 to start saving data required for user authentication operations (step A1).

The proxy user authenticating means 211 of the user authentication proxy 2 requests the user to send authentication data required for confirming that the user is an authorized user of the user authentication proxy 2 (step A2).

The user sends data, which indicates that the user is an authorized user of the user authentication proxy 2, from the user terminal 1 (step A3).

The proxy user authenticating means 211 of the user authentication proxy 2 compares data sent from the user authentication proxy 2 with data saved in the proxy user authentication data storage unit 221 to check to see if the user is an authorized user (step A4).

If it is found that the user is not an authorized user, the user authentication proxy 2 rejects the request to start saving data required for user authentication operations (step A5).

On the other hand, if it is found in step A4 that the user is an authorized user, the user authentication proxy 2 permits the user to start saving authentication operations data (step A6).

Figure 5:
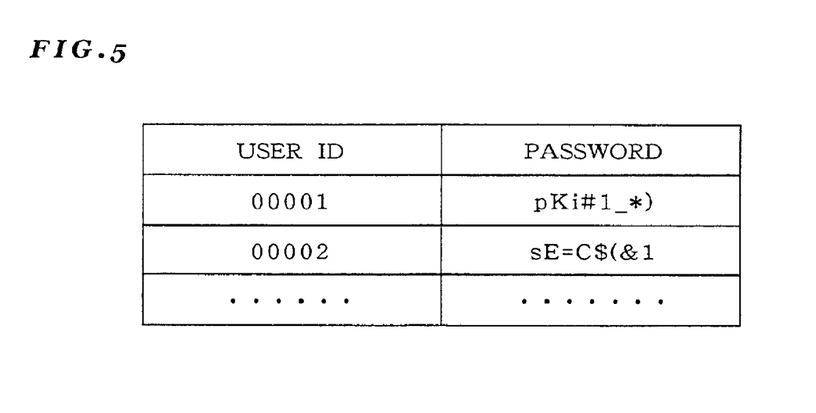
FIG. 5 is a diagram showing an example of the contents of proxy user authentication data storage unit in the embodiment of the present invention.

FIG. 5 is a diagram showing an example of data stored in the proxy user authentication data storage unit 221. In the example shown in FIG. 5, the user authentication proxy 2 uses a user ID uniquely identifying a user and a password as user authentication data.

If the user specifies [00001] as the user ID and [pKi#1_*)] as the password, the user is authenticated as an authorized user. If some other password is specified, the user is not authenticated as an authorized user.

If authenticated as an authorized user of the user authentication proxy 2, the user sends the URL (Uniform Resource Locator) of a web site from the user terminal 1 to the user authentication proxy 2 for user authentication (step A7).

The user authentication proxy 2 receives the URL from the user terminal 1, combines the URL with the identifier uniquely identifying the user, stores this combination in temporary storage, and then connects to the web server 4 (step A8).

The web server 4 receives the URL from the user authentication proxy 2 and returns data on the URL to the user authentication proxy 2 (step A9).

The user authentication proxy 2 combines the data received from the web server 4 with the identifier uniquely identifying the user and the URL, stores this combined data in temporary storage, and then sends the data to the user terminal 1 (step A10).

The user sends data required for web site user authentication operations from the user terminal 1 to the user authentication proxy 2 (step A11).

The user authentication proxy 2 receives web site user authentication operation data sent from the user terminal 1, combines the received data with the identifier uniquely identifying the user and the URL, stores the combined data in temporary storage, and sends the combined data to the web server 4 (step A12).

The web server 4 checks if the user authentication operation data sent from the user authentication proxy 2 to see if the user is an authorized user of the web site (step A13).

If it is found that the user is not an authorized user of the web site, the web server 4 notifies the user terminal 1 via the user authentication proxy 2 that the user authentication has failed (step A14).

If it is found that the user is an authorized user of the web site, the web server 4 notifies the user terminal 1 via the user authentication proxy 2 that the user authentication has successfully completed (step A15).

If the user is successfully authenticated at the web site, the user sends information, which indicates that authentication operation data has been saved, from the user terminal 1 to the user authentication proxy 2 (step A16).

The user authentication proxy 2 saves the following data, which was stored in temporary storage by the URL saving means 212, received data saving means 213, and sending data saving means 214, into the web site user authentication data storage unit 222 (step A17):

User identifier

URL

Data received by the user terminal 1 from the web server 4, and

Data sent by the user terminal 1 to the web server 4

Figure 6:
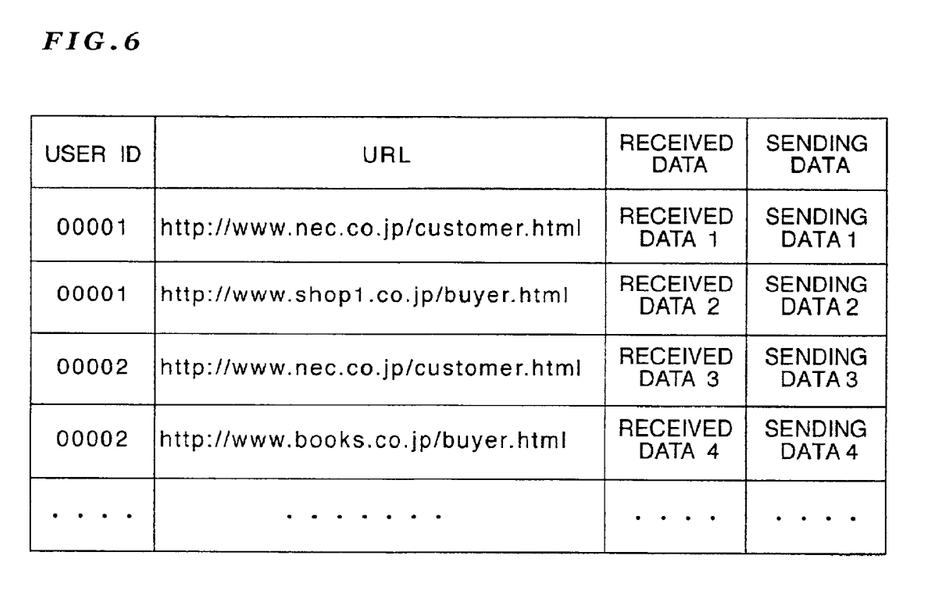
FIG. 6 is a diagram showing an example of the contents of web site user authentication data storage unit in the embodiment of the present invention.

FIG. 6 is a diagram showing an example of data stored in the web site user authentication data storage unit 222. In the example shown in FIG. 6, the several combinations, each composed of the following items, are saved.

User ID uniquely identifying the user
URL
Data received from the web server, and
Data sent to the web server For a user whose user ID is [00001], data sent to and received from the URL of http://www.nec.co.jp/customer.html and data sent to and received from the URL of http://www.shop1.co.jp/buyer.html are saved. They are set to allow the user authentication proxy 2 to perform user authentication operations at the web sites indicated by these two URLs on behalf of the user.

Similarly, for a user whose user ID is [00002], data sent to and received from the URL of http://www.nec.co.jp/customer.html and data sent to and received from the URL of http://www.books.co.jp/buyer.html are saved. They are set to allow the user authentication proxy 2 to perform user authentication operations at the web sites indicated by these two URLs on behalf of the user.

Figure 7:
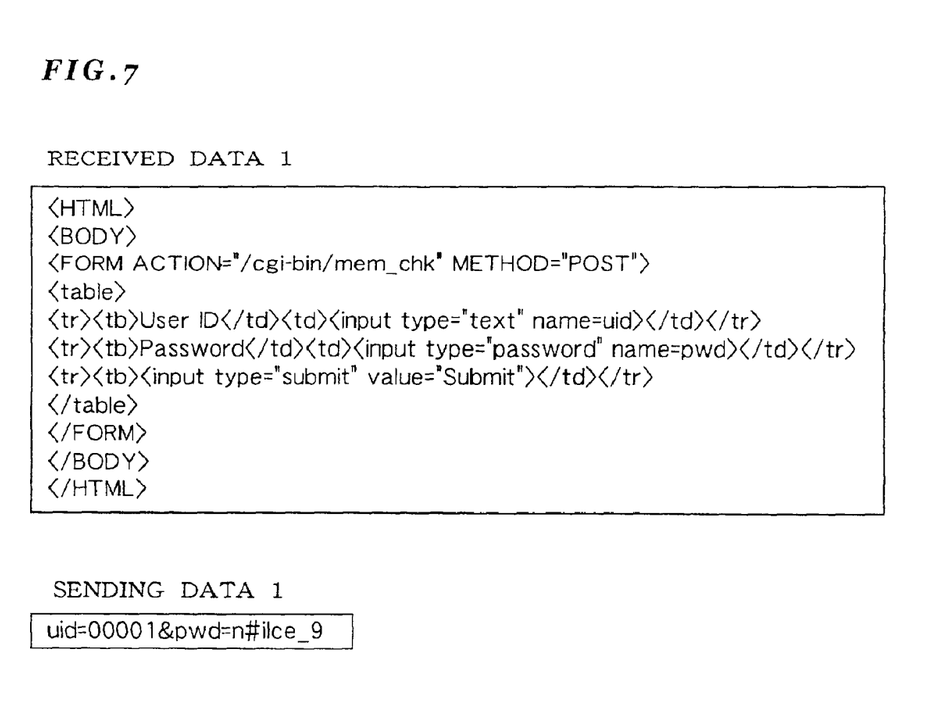
FIG. 7 is a diagram showing an example of received data and sending data in the embodiment of the present invention.

FIG. 7 is a diagram showing an example of [received data 1] and [sending data 1] shown in FIG. 6. [Received data 1] from the web server 4 is HTML (Hyper Text Markup Language) coded text. In this HTML coded text, the <FORM ACTION . . . > tag sends entered data to the CGI (/cgi-bin). In the part between the <table> tag and the </table> tag, the User ID column and the Password column are displayed, the input form is created (the input form is defined by <input type>), and the Submit button defined by value=[Submit] is displayed. Pressing the Submit button passes entered data to the CGI. As [sending data 1] to be sent to the web server 4, text (uid (user identifier) is 00001 and pwd is n#i1ce__9) to be passed to the POST method of the CGI (Common Gateway Interface) is saved.

Figure 8:
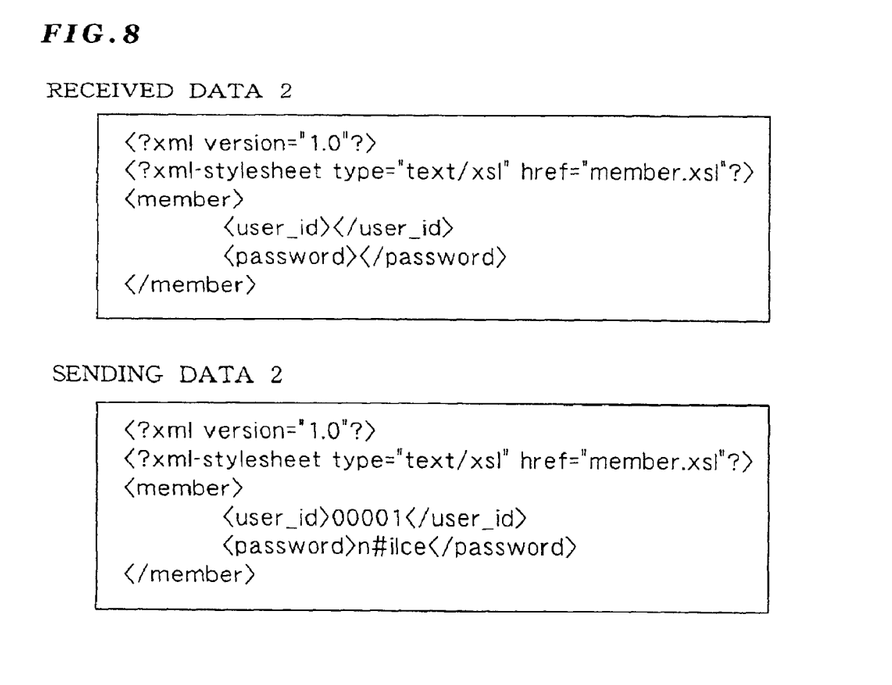
FIG. 8 is a diagram showing an example of received data and sending data in the embodiment of the present invention.

FIG. 8 is a diagram showing an example of received data 2 and sending data 2 shown in FIG. 6. In the example shown in FIG. 8, data received from the web server is saved as XML (extensible Markup Language) coded text. (A line beginning with <?xml:stylesheet indicates that the XLL (extensible Stylesheet Language) script that displays this XML document is [member.xsl]). Data to be sent to the web server is also saved as XML coded text.

Figure 4:
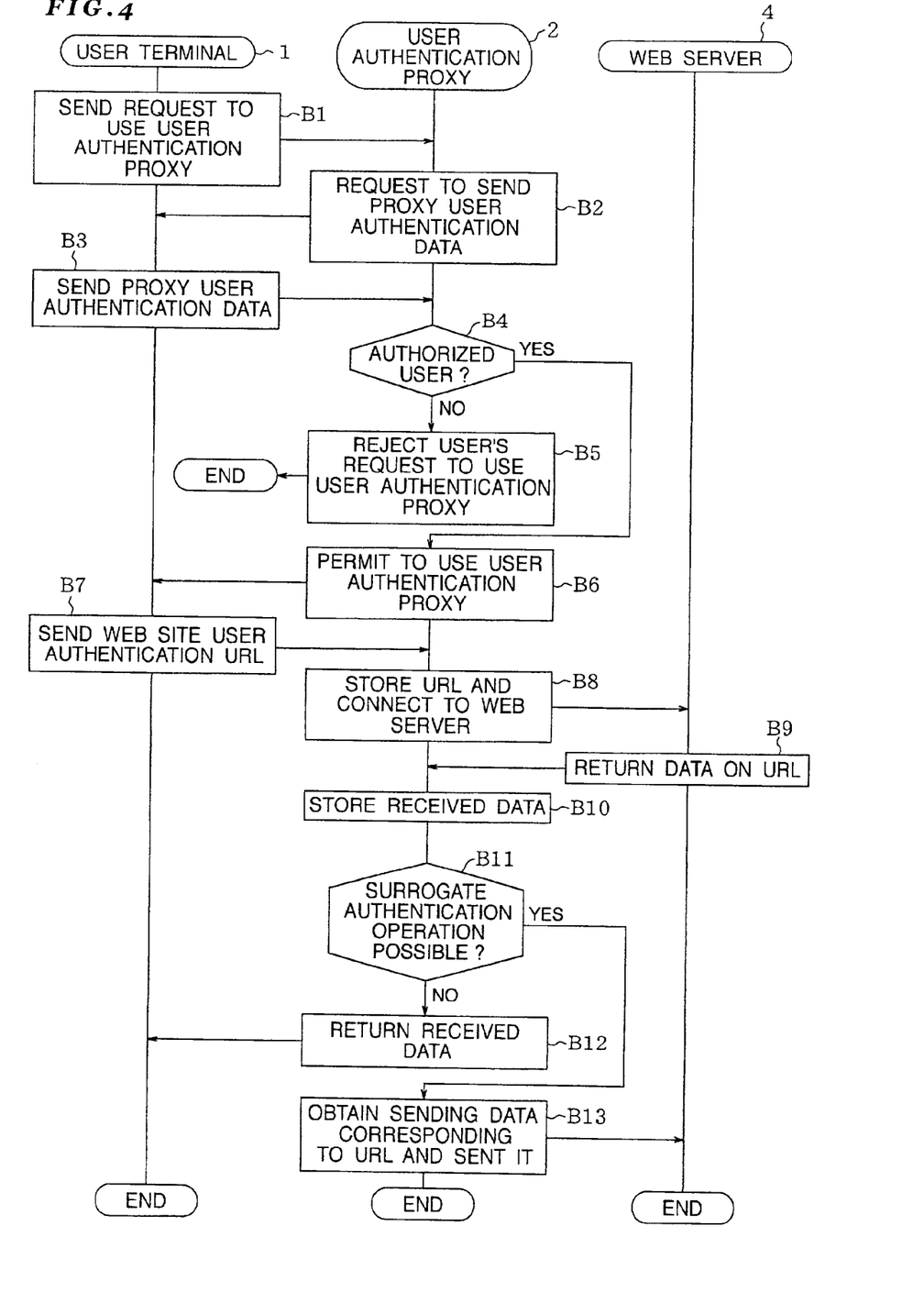
FIG. 4 is a flowchart showing the operation of the embodiment of the present invention.

Next, how the user uses the user authentication proxy 2 to perform user authentication operations at a web site on behalf of the user will be described in details with reference to the flowchart in FIG. 4.

First, from the user terminal 1, the user requests to use the user authentication proxy 2 (step B1).

The proxy user authenticating means 211 of the user authentication proxy 2 requests the user to send authentication data required for confirming that the user is an authorized user of the user authentication proxy 2 (step B2).

The user sends data, which indicates that the user is an authorized user of the user authentication proxy 2, from the user terminal 1 (step B3).

The proxy user authenticating means 211 of the user authentication proxy 2 compares data sent from the user terminal 1 with data saved in the proxy user authentication data storage unit 221 to check to see if the user is an authorized user (step B4).

If it is found that the user is not an authorized user, the user authentication proxy 2 rejects the user's request to use the proxy (step B5).

If it is found in step B4 that the user is an authorized user, the user authentication proxy 2 permits the user to use the proxy (step B6).

FIG. 5 is a diagram showing an example of data stored in the proxy user authentication data storage unit 221. In the example shown in FIG. 5, the user authentication proxy 2 uses a user ID uniquely identifying a user and a password as user authentication data. If the user specifies [00001] as the user ID and [pKi#1__*)] as the password, the user is authenticated as an authorized user. If some other password is specified, the user is not authenticated as an authorized user.

If authenticated as an authorized user of the user authentication proxy 2, the user sends the URL of a web site from the user terminal 1 to the user authentication proxy 2 for user authentication (step B7).

The user authentication proxy 2 receives the URL from the user terminal 1, combines the URL with the identifier uniquely identifying the user, stores this combination in temporary storage, and then connects to the web server 4 (step B8).

The web server 4 receives the URL from the user authentication proxy 2 and returns data on the URL to the user authentication proxy 2 (step B9).

The user authentication proxy 2 combines the data received from the web server 4 with the user-unique identifier and the URL and then stores this combined data in temporary storage (step B10).

The user authentication proxy 2 uses the URL comparing means 215 and the received data comparing means 216 to check to see if the combination (that is, the user identifier, the URL, and the received data from the web server) stored in temporary storage is present in the web site user authentication data storage unit 222 to determine if surrogate authentication operations are possible (step B11).

If the combination (the user identifier, the URL, and the data received from the web server) stored in temporary storage is not present in the web site user authentication data storage unit 222, the user authentication proxy 2 judges that surrogate user authentication operations are impossible and returns the data received from the web server 4 directly to the user terminal 1 (step B12).

If the combination (the user identifier, the URL, and the data received from the web server) stored in temporary storage is present in the web site user authentication data storage unit 222, the user authentication proxy 2 judges that surrogate user authentication operations are possible and uses the surrogate authentication operation data sending means 217 to obtain the corresponding sending data from the web site user authentication data storage unit 222 and send it to the web server 4 (step B13).

In the example shown in FIGS. 6 and 7, if the web server returns the same text as [received data 1] in FIG. 7 to the user authentication proxy 2 when the user with the user ID of [00001] accesses the URL of http://www.nec.co.jp/customer.html, the user authentication proxy 2 determines that surrogate authentication operations are possible and sends [sending data 1] in FIG. 7 to the web server 4.

In the example shown in FIGS. 6 and 8, if the web server returns the same text as [received data 2] in FIG. 8 to the user authentication proxy 2 when the user with the user ID of [00001] accesses the URL of http://www.shop1.co.jp/buyer.html, the user authentication proxy 2 determines that surrogate authentication operations are possible and sends [sending data 2] in FIG. 8 to the web server 4.

The present invention described above has the effects described below.

For example, a first effect of the present invention is that a proxy, provided between a user terminal and a web server for performing surrogate user authentication operations, allows the user to be authenticated through single sign-on for any web server requiring user authentication.

As described above, despite a rapid increase in the number of web sites requiring user authentication, the user authentication method is not standardized but each web site uses its own method. The method according to the present invention allows web sites, each with its own user authentication method, to perform user authentication though single sign-on with no additional load on web site providers. The present invention has special effects on such web sites.

A second effect of the present invention is that users in a system, where cellular phones or personal digital assistants are used as user terminals, may access all desired web sites through single sign-on. This significantly reduces the operations required for user authentication, reduces the user's load, and increases operability and convenience.

This is because a system according to the present invention has a proxy provided between a user terminal and a web server to save therein data transferred between the user terminal and the web server for reuse. Therefore, even if the user authentication method depends on a web site, the proxy saves data flowing through the network for later reuse in user authentication.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-214625 (filed on Jul. 14, 2000) including specification, claims, drawings and summary are incorporated herein by reference in its entirety. The invention may be embodied in other specific forms without departing from the spirit or essential characteristic thereof.

What is claimed is:

1. A single sign-on system for a web site, comprising:
an user authentication proxy unit between a user terminal and a web server for performing user authentication operations required for the web site, said user terminal accessing the web server over the Internet,
wherein said user authentication proxy unit comprises means for recording data received from the user terminal required for performing user authentication operations, and
wherein said user authentication proxy unit performs user authentication operations for the web site specified by the user terminal to reduce user authentication operations on the user terminal.

2. The single sign-on system for a web site according to claim 1, wherein, when a user is authenticated, said user authentication proxy unit saves data transferred between the user terminal and the web server into storage means and, when the user authentication operations are performed on behalf of the user terminal, the data stored in said storage means is reused.

3. A single sign-on system for a web site, comprising:
a user authentication proxy unit between a user terminal and a web server, said user terminal accessing the web server over the Internet,
wherein said user authentication proxy unit comprises:
means for saving information in storage means for use as information associated with a sequence of user authentication processes executed by a user between the user terminal and the web server over the Internet, said information including a URL (Uniform Resource Locator) of a web site, data received by the user terminal from the web server for user authentication, and data sent by the user terminal to the web server for user authentication; and
means for sending a connection request to the web server specified by the URL when the user uses any user terminal to specify the URL of the web site, for comparing, when data on the URL is received from the web server, the received data with data saved in advance in said storage means, and, if a match is found, for sending user authentication sending data saved in advance in the storage means to the web server on behalf of the user terminal instead of transferring to the user terminal the data received from the web server.

4. A user authentication proxy unit provided between a user terminal and a web server, said user terminal accessing the web server over the Internet, comprising:
means for saving information in storage means for use as information associated with a sequence of user authentication processes executed by a user between the user terminal and the web server over the Internet, said information being a combination of three data pieces, that is, a URL (Uniform Resource Locator) of a web site, data received by the user terminal from the web server for user authentication, and data sent by the user terminal to the web server for user authentication; and
means for sending a connection request to the web server specified by the URL when the user uses any user terminal to specify the URL of the web site, for comparing, when data on the URL is received from the web server, the received data with data saved in advance in said storage means, and, if a match is found, for sending user authentication sending data saved in advance in the storage means to the web server on behalf of the user terminal instead of transferring to the user terminal the data received from the web server.

5. A user authentication proxy unit provided between a user terminal and a web server, said user terminal accessing the web server over the Internet, comprising:
a storage unit which comprises:
a proxy user authentication data storage unit that stores therein a user identifier uniquely identifying a user and a password, said user identifier and said password being required for confirming that the user using said user authentication proxy unit is an authorized user; and
a web site user authentication data storage unit that stores therein combinations of data, each of said combinations being composed of a user identifier uniquely identifying a user, a URL of a web site, data received by the user terminal from the web server for user authentication, and data sent by the user terminal to the web server for user authentication;
proxy user authenticating means for authenticating, using data saved in said proxy user authentication data storage unit, whether the user is an authorized user of said user authentication proxy unit;
URL saving means for saving a combination of the URL of the web site and the user identifier in said web site user authentication data storage unit, said web site being a web site for which a user has asked said user authentication proxy unit to perform user authentication operations, said user identifier uniquely identifying the user;
received data saving means for saving the data, received by the user terminal from the web server for user authentication, into said web site user authentication data storage unit;
sending data saving means for saving the data, sent by said user terminal to the web server for user authentication, into said web site user authentication data storage unit;
URL comparing means for comparing a URL specified by the user on the user terminal with the URL saved in the web site user authentication data storage unit to determine if the URL specified by the user is the one for which said proxy user authentication unit is to perform user authentication operations;
received data comparing means for comparing data received from the web server to which a connection is made using the URL specified by the user with the received data saved in said web site user authentication data storage unit; and surrogate authentication operation data sending means which, if said web site user authentication data storage unit stores therein a matching combination of the user identifier, URL, and received data from the web server, judges that user authentication operations may be performed on behalf of the user terminal, obtains corresponding sending data from said web site user authentication data storage unit for performing user authentication operations, and sends the obtained data to the web server.

6. A method for performing user authentication operations for a web site on behalf of a user, wherein a user authentication proxy unit is provided between a user terminal and a web server for performing user authentication operations required for the web site, said user terminal accessing the web server over the Internet, wherein said user authentication proxy unit records data received from the user terminal required for performing user authentication operations, and wherein said user authentication proxy unit performs user authentication operations for the web site whose URL is specified by the user, regardless of a type of the user terminal.

7. The method for performing user authentication operations for a web site on behalf of a user according to claim 6, wherein, when the user is authenticated, said user authentication proxy unit saves data transferred between the user terminal and the web server and, when the user authentication operations are performed on behalf of the user, the saved data is reused.

8. A method for performing user authentication operations for a web site on behalf of a user, wherein a user authentication proxy unit is provided between a user terminal and a web server, said user terminal accessing the web server over the Internet, said method comprising the steps of:

saving information in storage means for use as information associated with a sequence of user authentication processes executed by a user between the user terminal and the web server over the Internet, said information being a combination of three data pieces, that is, a URL (Uniform Resource Locator) of a web site, data received by the user terminal from the web server for user authentication, and data sent by the user terminal to the web server for user authentication;

sending a connection request to the web server specified by the URL when the user uses any user terminal to specify the URL of the web site;

when data on the URL is received from the web server, comparing the received data with data saved in advance in said storage means and, if a match is found, sending user authentication sending data saved in advance in the storage means to the web server on behalf of the user terminal instead of transferring to the user terminal the data received from the web server.

9. A recording medium storing thereon a program for use on a user authentication proxy unit provided between a user terminal and a web server, said user terminal accessing the web server over the Internet, said program causing a computer on the user authentication proxy unit to:

(a) save information in storage means for use as information associated with a sequence of user authentication processes executed by a user between the user terminal and the web server over the Internet, said information being a combination of three data pieces, that is, a URL (Uniform Resource Locator) of a web site, data received by the user terminal from the web server for user authentication, and data sent by the user terminal to the web server for user authentication; and (b) send a connection request to the web server specified by the URL when the user uses any user terminal to specify the URL of the web site, compare, when data on the URL is received from the web server, the received data with data saved in advance in said storage means, and, if a match is found, send user authentication sending data saved in advance in the storage means to the web server on behalf of the user terminal instead of transferring to the user terminal the data received from the web server.

10. A recording medium storing thereon a program for use on a user authentication proxy unit provided between a user terminal and a web server, said user terminal accessing the web server over the Internet, said user authentication proxy unit comprising:

a proxy user authentication data storage unit that stores therein a use identifier uniquely identifying a user and a password, said user identifier and said password being required for confirming that the user using said user authentication proxy unit is an authorized user; and a web site user authentication data storage unit that stores therein combinations of data, each of said combinations being composed of a user identifier uniquely identifying a user, a URL of a web site, data received by the user terminal from the web server for user authentication, and data sent by the user terminal to the web server for user authentication, said program causing a computer on the user authentication proxy unit to:

(a) authenticate, using data saved in said proxy user authentication data storage unit, whether the user is an authorized user of said user authentication proxy unit;

(b) save a combination of the URL of the web site and the user identifier in said web site user authentication data storage unit, said web site being a web site for which a user has asked said user authentication proxy unit to perform user authentication operations, said user identifier uniquely identifying the user, (c) save the data, received by the user terminal from the web server for user authentication, into said web site user authentication data storage unit;

(d) save the data, sent by said user terminal to the web server for user authentication, into said web site user authentication data storage unit;

(e) compare a URL specified by the user on the user terminal with the URL saved in the web site user authentication data storage unit to determine if the URL specified by the user is the one for which said proxy user authentication unit is to perform user authentication operations;

(f) compare data received from the web server to which a connection is made using the URL specified by the user with the received data saved in said web site user authentication data storage unit; and (g) if said web site user authentication data storage unit stores therein a matching combination of the user identifier, URL, and received data from the web server, judge that user authentication operations maybe performed on behalf of the user terminal, obtain sending data required for performing user authentication operations on behalf of the user terminal from said web site user authentication data storage unit, and send the obtained data to the web server.

* * * * *